(12) United States Patent
Choi

(10) Patent No.: US 10,145,321 B2
(45) Date of Patent: Dec. 4, 2018

(54) ENGINE SYSTEM HAVING EXHAUST GAS RECIRCULATION APPARATUS

(71) Applicant: HYUNDAI MOTOR COMPANY, Seoul (KR)

(72) Inventor: Choo Saeng Choi, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/377,345

(22) Filed: Dec. 13, 2016

(65) Prior Publication Data

US 2018/0038296 A1 Feb. 8, 2018

(30) Foreign Application Priority Data

Aug. 4, 2016 (KR) .......................... 10-2016-0099483

(51) Int. Cl.
| | | |
|---|---|---|
| *F02B 33/44* | (2006.01) | |
| *F02D 41/00* | (2006.01) | |
| *F02M 26/04* | (2016.01) | |
| *F02M 26/33* | (2016.01) | |
| *F02M 26/47* | (2016.01) | |

(Continued)

(52) U.S. Cl.
CPC ..... *F02D 41/0077* (2013.01); *F02D 41/0072* (2013.01); *F02D 41/021* (2013.01); *F02M 26/04* (2016.02); *F02M 26/33* (2016.02); *F02M 26/47* (2016.02); *F02M 26/52* (2016.02); *F02D 41/1448* (2013.01); *F02D 2041/0075* (2013.01); *F02D 2200/0406* (2013.01); *F02D 2200/701* (2013.01)

(58) Field of Classification Search
CPC ........ F02M 26/04–26/06; F02M 26/14; F02M 26/47

USPC ...................................... 60/605.2; 123/568.11
See application file for complete search history.

(56) References Cited

U.S. PATENT DOCUMENTS

| | | | |
|---|---|---|---|
| 6,308,666 B1 * | 10/2001 | Drecq ..................... | F02B 27/06 |
| | | | 123/58.8 |
| 7,693,645 B2 * | 4/2010 | Nam ................... | F02D 41/0052 |
| | | | 123/568.21 |

(Continued)

FOREIGN PATENT DOCUMENTS

| | | |
|---|---|---|
| JP | 2001-003817 A | 1/2001 |
| JP | 2002-332919 A | 11/2002 |
| KR | 10-2011-0062132 A | 6/2011 |

*Primary Examiner* — Ngoc T Nguyen
(74) *Attorney, Agent, or Firm* — McDermott Will & Emery LLP

(57) ABSTRACT

An engine system having an exhaust gas recirculation (EGR) apparatus includes: an engine including a plurality of combustion chambers; an intake line through which an intake gas supplied to the combustion chambers flows; an exhaust line in which an exhaust gas discharged from the combustion chambers flows; and a turbocharger including: a turbine disposed at the exhaust line and rotating by the exhaust gas; and a compressor disposed in the intake line and rotating and compressing external air. The EGR apparatus includes a recirculation line branched from the exhaust line; an EGR valve disposed at the recirculation line and adjusting a recirculation gas amount; a pressure sensor disposed at a front end of the EGR valve to measure a pressure of a recirculation gas; and a flow rate adjustment apparatus disposed at a rear end of the EGR valve and adjusting the recirculation gas amount.

13 Claims, 4 Drawing Sheets

(51) Int. Cl.
*F02M 26/52* (2016.01)
*F02D 41/02* (2006.01)
*F02D 41/14* (2006.01)

(56) References Cited

U.S. PATENT DOCUMENTS

| | | | | |
|---|---|---|---|---|
| 2009/0277431 | A1* | 11/2009 | Nitzke | F02D 9/04 |
| | | | | 123/568.12 |
| 2012/0312001 | A1* | 12/2012 | Nam | F02D 41/0072 |
| | | | | 60/299 |
| 2012/0312283 | A1* | 12/2012 | Nam | F02D 41/0065 |
| | | | | 123/568.11 |
| 2013/0074494 | A1* | 3/2013 | Chi | F02D 41/0072 |
| | | | | 60/605.2 |
| 2014/0373814 | A1* | 12/2014 | Herold | F02D 41/0007 |
| | | | | 123/51 B |
| 2015/0192087 | A1* | 7/2015 | Shirahashi | F02D 41/405 |
| | | | | 701/104 |
| 2015/0233326 | A1* | 8/2015 | Takaki | F02M 25/072 |
| | | | | 123/559.2 |
| 2016/0069300 | A1* | 3/2016 | Minamoto | F02D 41/0065 |
| | | | | 123/568.11 |
| 2016/0076467 | A1* | 3/2016 | Prumm | F02D 41/0072 |
| | | | | 123/568.11 |

\* cited by examiner

ENGINE SYSTEM HAVING EXHAUST GAS RECIRCULATION APPARATUS

CROSS-REFERENCE TO RELATED APPLICATION

This application claims the benefit of priority to Korean Patent Application No. 10-2016-0099483 filed in the Korean Intellectual Property Office on Aug. 4, 2016, the entire content of which is incorporated herein by reference.

TECHNICAL FIELD

The present disclosure relates to an engine system having an exhaust gas recirculation (EGR) apparatus. More particularly, the present disclosure relates to an engine system having an EGR apparatus that can accurately measure and control a recirculation gas flow rate.

BACKGROUND

A vehicle engine mixes and burns air, which is injected from the outside, and fuel with an appropriate ratio, thereby generating power.

In the process of generating the power by driving the engine, a desired output and combustion efficiency can be obtained only when fully supplying the external air for combustion. For this reason, in order to enhance combustion efficiency of the engine, as an apparatus that supercharges and supplies air for combustion, a turbocharger is used.

In general, a turbocharger is a device that rotates a turbine using a pressure of an exhaust gas that is discharged from the engine and that enhances an output of the engine by supplying air of a high pressure to a combustion chamber of the engine using a torque thereof. The turbocharger can be applied to both a diesel engine and a gasoline engine.

Further, nitrogen oxide (NOx) that is included in an exhaust gas is regulated as a major air pollution material, and many researches for reducing discharge of such NOx have been performed.

In order to reduce a noxious exhaust gas, an exhaust gas recirculation (EGR) system is mounted in a vehicle. Generally, when combustion is well performed due to a high air ratio in a mixer, NOx increases. Therefore, the EGR system suppresses NOx from occurring by reducing an oxygen amount of the mixer and by disturbing combustion by again mixing a portion (e.g., 5-20%) of an exhaust gas that is discharged from the engine to the mixer.

In order to enhance fuel consumption, the EGR system of a gasoline engine is generally mounted in a vehicle. A pumping loss can be reduced in a low speed/low load area through the EGR system and ignition timing can be advanced by temperature reduction of a combustion chamber in an intermediate speed/intermediate load area, and thus, fuel consumption of the vehicle can be enhanced.

A representative EGR system includes a low pressure exhaust gas recirculation (LP-EGR) apparatus. The LP-EGR apparatus recirculates an exhaust gas, having passed through a turbine of a turbocharger to an intake path of the front end of a compressor.

When the turbocharger operates, a conventional EGR system supplies a recirculation gas to a combustion chamber of an engine by a torque of a turbine and a compressor.

However, when the turbocharger does not operate, a negative pressure scarcely occurs at the front end of the compressor, and thus, a method of applying a separate differential pressure generation valve is reviewed. However, when such a differential pressure generation valve is mounted, a problem occurs that a production cost of a vehicle increases.

Further, a differential pressure sensor that detects a pressure difference between a front end and a rear end of the EGR valve that adjusts a recirculation gas amount is provided, and because a pressure difference between the front end and the rear end of the EGR valve in a low speed/low load area is small, a degree of precision of an EGR control is deteriorated.

Therefore, because an accurate recirculation gas amount cannot be adjusted, combustion stability cannot be secured, and thus, ignition timing cannot be advanced and a problem occurs that it is difficult to enhance fuel consumption of a vehicle.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide an engine system having an EGR apparatus having advantages of being capable of accurately controlling a recirculation gas amount without using a separate differential pressure sensor.

The present disclosure has been made in an effort to further provide an engine system having an EGR apparatus having advantages of being capable of enhancing combustion stability and fuel consumption of a vehicle through the control of an accurate recirculation gas amount.

According to an exemplary embodiment of the present disclosure, an engine system having an exhaust gas recirculation (EGR) apparatus includes: an engine including a plurality of combustion chambers that generate a driving torque by combustion of fuel; an intake line through which an intake gas supplied to the combustion chambers flows; an exhaust line in which an exhaust gas discharged from the combustion chambers flows; and a turbocharger including: a turbine disposed at the exhaust line and rotating by an exhaust gas that is discharged from the combustion chambers; and a compressor, which is disposed in the intake line, rotating by interlocking with the turbine and compressing external air. The EGR apparatus includes a recirculation line branched from the exhaust line to join to the intake line; an EGR valve disposed at the recirculation line and adjusting a recirculation gas amount, a pressure sensor installed at a front end of the EGR valve of the recirculation line to measure a pressure of a recirculation gas, and a flow rate adjustment apparatus installed at a rear end of the EGR valve of the recirculation line and adjusting the recirculation gas amount.

The flow rate adjustment apparatus may include: a drive motor that generates a power; a flap that is installed at a rotating shaft of the drive motor and that rotates by a recirculation gas that flows the recirculation line or that rotates by the power of the drive motor; and a speed sensor that detects a rotational speed of the flap.

The flap may be disposed vertically to a movement direction of a recirculation gas that flows the recirculation line.

The rotating shaft of the drive motor may be located at an exterior circumference of the recirculation line.

The engine system may further include: a driving information detector that detects driving information of a vehicle;

and a controller that controls the flow rate adjustment apparatus according to the driving information.

The controller may determine whether the EGR apparatus is in a use area from the driving information and close the EGR valve, if the EGR apparatus is not in the use area.

The controller may open the EGR valve, if the EGR apparatus is in the use area and block power that is supplied to the drive motor and adjust an open level of the EGR valve to control an EGR ratio, if an internal pressure of the recirculation line that is detected by the pressure sensor is equal to or larger than a reference pressure.

The controller may supply power to the drive motor and control the rotational speed of the flap according to the pressure of the recirculation gas and a target EGR ratio, if an internal pressure of the recirculation line that is detected by the pressure sensor is smaller than the reference pressure.

According to another embodiment of the present disclosure, a method of controlling an engine system, which includes an engine and an exhaust gas recirculation (EGR) apparatus, which supplies a portion of an exhaust gas discharged from the engine to a combustion chamber of the engine, includes: detecting, by a driving information detector, driving information; determining, by a controller, from the driving information whether the EGR apparatus is in an use area; and controlling, by the controller, if the EGR apparatus is in the use area, operation of a flow rate adjustment apparatus and an EGR valve of the EGR apparatus.

The step of controlling the operation of the flow rate adjustment apparatus may include: opening, by the controller, if the EGR apparatus is in the use area, the EGR valve; measuring, by a pressure sensor disposed at a recirculation line of the EGR apparatus, a pressure of the exhaust gas that flows the recirculation line; and controlling, by the controller, operation of a drive motor of the flow rate adjustment apparatus.

The method may further include controlling, if a pressure of the recirculation gas is smaller than a reference pressure, a rotational speed of a flap that is installed in the drive motor according to a pressure of the exhaust gas and a target EGR ratio by applying power to the drive motor.

The method may further include blocking, if the pressure of the recirculation gas is equal to or larger than the reference pressure, power that is supplied to the drive motor and adjusting an open level of the EGR valve to control an EGR ratio.

The method may further include closing, if the EGR apparatus is not in the use area, the EGR valve of the EGR apparatus.

As described above, according to the engine system having the EGR apparatus by the exemplary embodiment of the present disclosure, a recirculation gas amount can be accurately measured and adjusted through a flow rate adjustment apparatus that is disposed in a recirculation line.

Further, because a recirculation gas amount can be accurately controlled, combustion stability can be secured and fuel consumption can be enhanced.

In addition, since a separate differential pressure generation valve and differential pressure sensor can be removed, a production cost of a vehicle can be reduced.

BRIEF DESCRIPTION OF THE DRAWINGS

The drawings are illustrated for describing an exemplary embodiment of the present disclosure and thus the scope of the present disclosure should not be analyzed to be limited to the accompanying drawings.

DETAILED DESCRIPTION OF THE EMBODIMENTS

Figure 1:
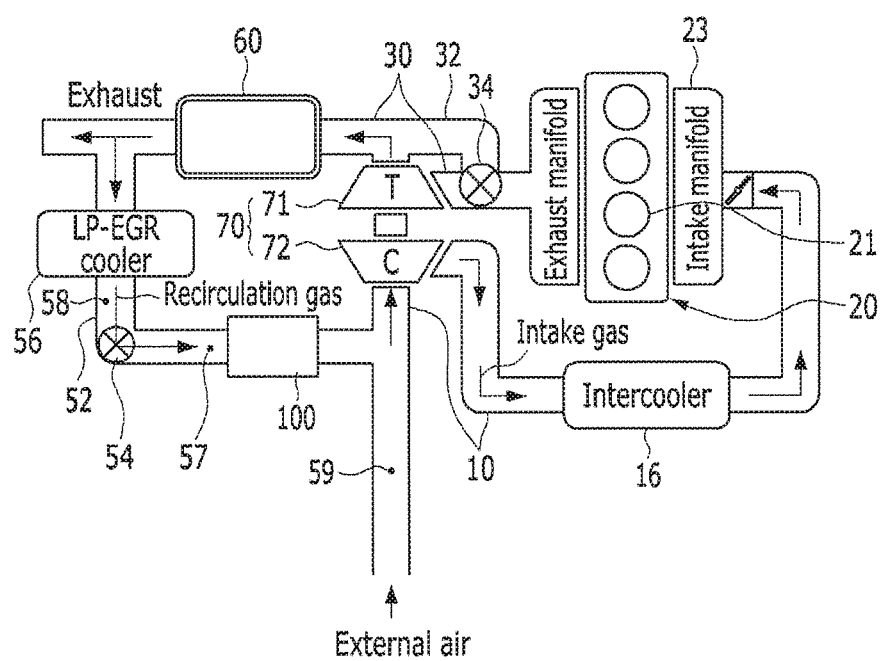
FIG. 1 is a schematic view illustrating a configuration of an engine system having an exhaust gas recirculation (EGR) apparatus according to an exemplary embodiment of the present disclosure.

The present disclosure will be described more fully hereinafter with reference to the accompanying drawings, in which exemplary embodiments of the invention are shown. As those skilled in the art would realize, the described embodiments may be modified in various different ways, all without departing from the spirit or scope of the present disclosure.

The drawings and description are to be regarded as illustrative in nature and not restrictive. Like reference numerals designate like elements throughout the specification.

Further, in the drawings, a size and thickness of each element are randomly represented for better understanding and ease of description, and the present disclosure is not limited thereto, and the thickness of several portions and areas are exaggerated for clarity.

Hereinafter, an engine system having an exhaust gas recirculation (EGR) apparatus according to an exemplary embodiment of the present disclosure will be described in detail with reference to the attached drawings.

Figure 2:
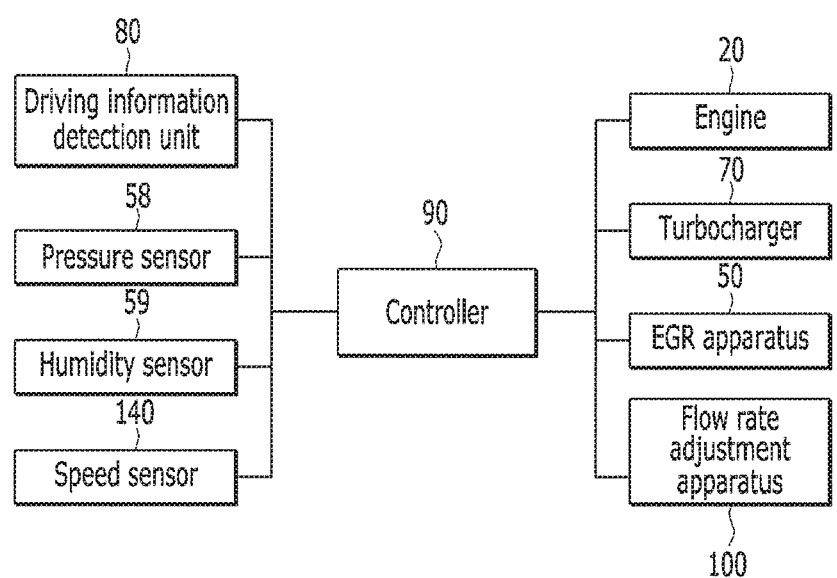
FIG. 2 is a block diagram illustrating a configuration of an engine system having an EGR apparatus according to an exemplary embodiment of the present disclosure.

FIG. 1 is a schematic view illustrating a configuration of an engine system having an EGR apparatus according to an exemplary embodiment of the present disclosure. FIG. 2 is a block diagram illustrating a configuration of an engine system having an exhaust gas recirculation (EGR) apparatus according to an exemplary embodiment of the present disclosure.

As shown in FIGS. 1 and 2, an engine system having an EGR apparatus according to an exemplary embodiment includes an engine 20, a turbocharger 70, an intercooler 16, an exhaust gas recirculation (EGR) apparatus 50, a driving information detector 80, and a controller 90.

The engine 20 includes a plurality of combustion chambers 21 that generate a driving torque by combustion of fuel. The engine 20 has an intake line 10 in which an intake gas that is supplied to the combustion chamber 21 flows and an exhaust line 30 in which an exhaust gas that is discharged from the combustion chamber 21 flows.

In the exhaust line 30, an exhaust gas purification apparatus 60 that purifies various harmful materials that are included in an exhaust gas that is discharged from the combustion chamber 21 is provided. The exhaust gas purification apparatus 60 may include a lean NOx trap (LNT), a diesel oxidation catalyst, and a diesel particulate filter for purifying nitrogen oxide.

The turbocharger 70 compresses an intake gas (external air+recirculation gas) that is injected through the intake line 10 and supplies the compressed intake gas to the combustion chamber 21. The turbocharger 70 includes: a turbine 71 that is provided in the exhaust line 30 and that rotates by the exhaust gas discharged from the combustion chamber 21; and a compressor 72 that rotates by interlocking with the turbine 71 and that compresses the intake gas.

The EGR apparatus 50 includes a recirculation line 52, an EGR cooler 56, an EGR valve 54, and a flow rate adjustment apparatus 100.

The recirculation line 52 is branched from the exhaust line 30 of the rear end of the turbocharger 70 to join to the intake line 10. The EGR cooler 56 is disposed at the recirculation line 52 and cools an exhaust gas that flows the recirculation line 52. The flow rate adjustment apparatus 100, which is installed in the recirculation line 52, measures and adjusts a recirculation gas amount that flows the recirculation line 52. The EGR valve 54 is disposed at a point in which the recirculation line 52 and the intake line 10 join and adjusts the recirculation gas amount that is injected into the intake line 10. Here, an exhaust gas that is supplied to the intake line 10 through the recirculation line 52 may be referred to as a recirculation gas.

Figure 3:
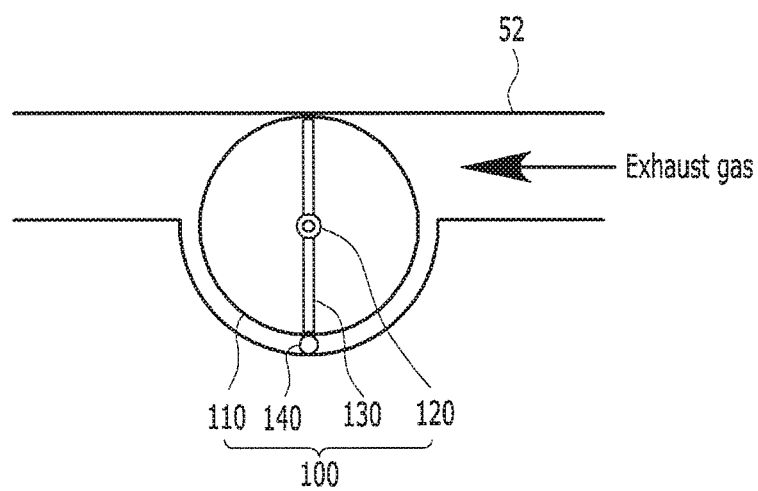
FIG. 3 is a top plan view illustrating a configuration of a flow rate adjustment apparatus according to an exemplary embodiment of the present disclosure.

Referring to FIG. 3, the flow rate adjustment apparatus 100 includes: a drive motor 110 generating power; and a flap 130 installed in a rotating shaft 120 of the drive motor 110 and rotating by a recirculation gas which flows the recirculation line or that rotates by the power of the drive motor 110. Here, the flow rate adjustment apparatus 100 may further include a speed sensor 140 that detects a rotational speed of the flap 130.

In this case, the flap 130 is disposed vertically to a movement direction of a circulation gas that flows the recirculation line, and the rotating shaft 120 of the drive motor 110 is located at the outside of the recirculation line. Therefore, friction resistance of the flap 130 according to the movement of the recirculation gas may be minimized and the recirculation gas amount may be accurately measured.

That is, the recirculation gas amount that flows the recirculation line may be measured from a rotational speed of the flap 130 that is measured through the speed sensor 140 and a pressure of a recirculation line that is measured through the pressure sensor 58 to be described later.

Referring to FIGS. 1 and 2, the intercooler 16 cools the intake gas that is injected through the intake line 10 through heat exchange with coolant. That is, because the intake gas, which is compressed by the turbocharger 70, expands with a high temperature, an oxygen density of an intake gas that is supplied to the combustion chamber 21 is lowered, and thus, it is difficult to output a torque requiring in the engine 20. Therefore, by increasing a density of the intake gas by cooling the intake gas through the intercooler 16, combustion efficiency of the engine 20 is improved.

The controller 90 controls operation of the engine 20, the turbocharger 70, the EGR valve 54, and the flow rate adjustment apparatus 100.

The controller 90 may have at least one processor operating by a predetermined program, and the predetermined program may perform each step of a method of controlling an engine according to an exemplary embodiment of the present disclosure.

The driving information detector 80 detects driving information and transmits the detected driving information to the controller 90. The driving information may include an intake temperature, a coolant temperature, a vehicle speed, and an engine load of the engine.

The controller 90 controls operation of the flow rate adjustment apparatus 100 according to driving information that is detected by the driving information detector 80.

Specifically, the controller 90 determines whether a driving area of the vehicle is a use area of the EGR apparatus from the driving information.

If the driving area of the vehicle is not the use area of the EGR apparatus, the controller 90 closes the EGR valve 54 to block the exhaust gas that flows the exhaust line 30 from being supplied to the intake line 10 through the recirculation line 52.

If the driving area of the vehicle is the use area of the EGR apparatus, the controller 90 opens the EGR valve 54. If a recirculation gas pressure within the recirculation line 52 that is detected by the pressure sensor 58 is equal to or larger than a reference pressure, the controller 90 blocks the power that is supplied to the drive motor 110 and adjusts an open level of the EGR valve 54 to control an EGR ratio.

In general, a pressure of external air that is injected through the intake line 10 maintains an atmospheric pressure level. Therefore, a pressure difference between a front end and a rear end of the EGR valve 54 may be detected through a pressure of the recirculation gas that is measured by the pressure sensor 58 installed at the front end of the EGR valve 54.

Therefore, if a recirculation gas pressure that is detected through the pressure sensor 58 is equal to or larger than the reference pressure, a pressure difference between the front end and the rear end of the EGR valve 54 for supplying a recirculation gas is enough. Therefore, by blocking the power that is supplied to the drive motor 110, the flap 130 that is installed in the rotating shaft 120 of the drive motor 110 freely rotates by a recirculation gas and the recirculation gas is injected into the intake line 10.

However, if an internal pressure of the recirculation line that is detected by the pressure sensor 58 is smaller than the reference pressure, a pressure difference between the front end and the rear end of the EGR valve 54 for supplying a recirculation gas to the intake line 10 is small.

In such a case, the controller 90 supplies the power to the drive motor 110 to control a rotational speed of the flap 130 according to a pressure of the recirculation gas and a target EGR ratio. Here, an EGR ratio means an occupying ratio of the recirculation gas amount that is injected into the engine through an EGR system among an entire air amount (new air+recirculation gas) that is injected into the engine.

When a pressure difference between the front end and the rear end of the EGR valve 54 is small, it is difficult to accurately control a recirculation gas to the intake line 10 with only the control of the EGR valve 54. However, in the present disclosure, in even a case in which a pressure difference between the front end and the rear end of the EGR valve 54 through the flow rate adjustment apparatus 100 is small, the recirculation gas amount may be precisely controlled.

The engine system according to an exemplary embodiment of the present disclosure may further include a humidity sensor 59 that is installed in the intake line 10. A humidity of new air that is measured by the humidity sensor 59 is transmitted to the controller 90.

The controller 90 may compensate for the EGR ratio according to a humidity of new air that is measured by the humidity sensor 59. For example, if a humidity of new air that is measured by the humidity sensor 59 is equal to or larger than a predetermined humidity, the EGR ratio may be reduced according to humidity of new air.

The engine system according to an exemplary embodiment of the present disclosure may further include an exhaust gas temperature sensor 57 that is installed in the recirculation line 52. A temperature of the recirculation gas that is measured by the exhaust gas temperature sensor 57 is transmitted to the controller 90.

The controller 90 may compensate for the EGR ratio according to a temperature of the recirculation gas that is measured by the exhaust gas temperature sensor 57. For example, the controller 90 may compensate the EGR ratio according to the temperature of the exhaust gas. The EGR ratio according to the temperature of the exhaust gas may be stored in the controller 90 as a map data format.

Hereinafter, a method of controlling an engine system according to an exemplary embodiment of the present disclosure will be described in detail with reference to the attached drawings.

Figure 4:
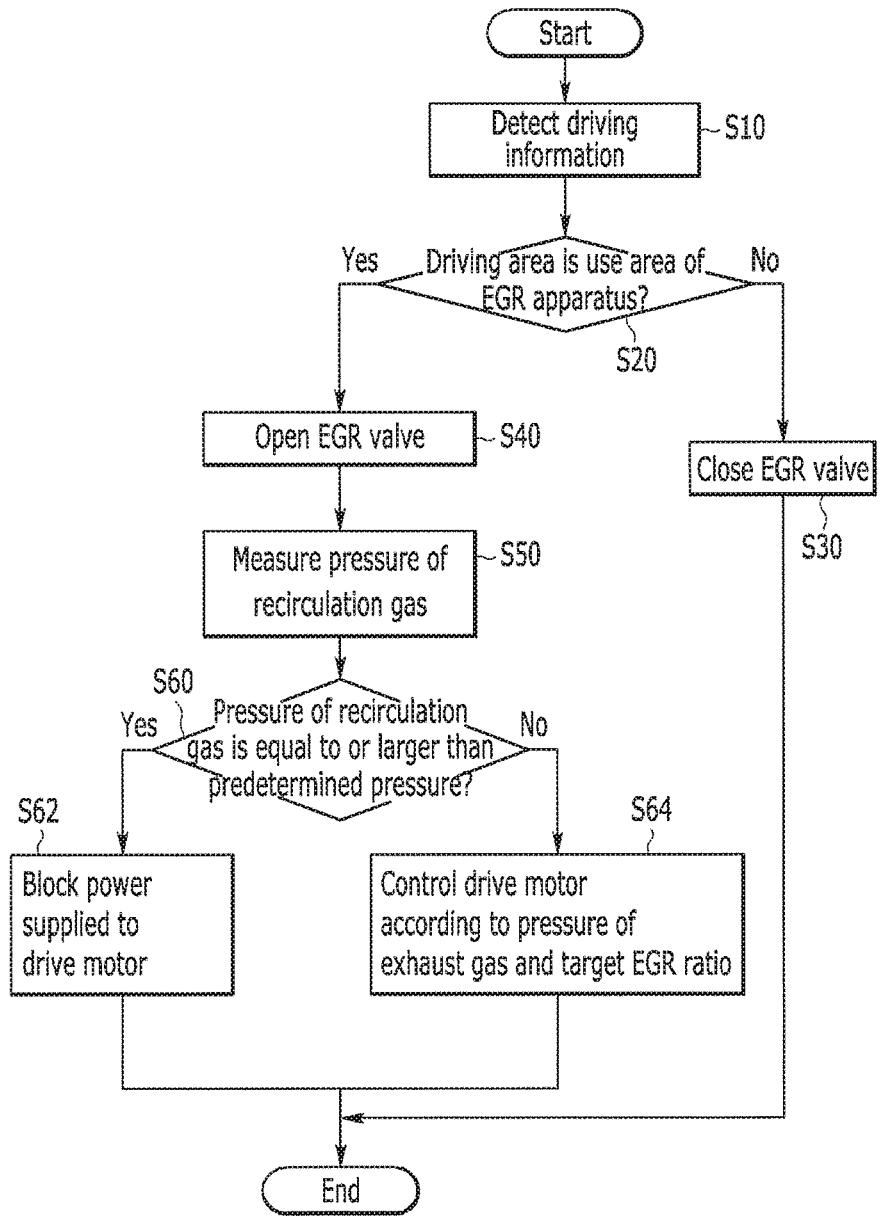
FIG. 4 is a flowchart illustrating a method of controlling an engine system having an EGR apparatus according to an exemplary embodiment of the present disclosure.

FIG. 4 is a flowchart illustrating a method of controlling an engine system having an EGR apparatus according to an exemplary embodiment of the present disclosure.

As shown in FIG. 4, the driving information detector 80 detects driving information including an intake temperature, a coolant temperature, a vehicle speed, an engine speed, and an engine load of an engine (S10). The driving information that is detected by the driving information detector 80 is transmitted to the controller 90. According to an exemplary embodiment of the present disclosure, the driving information detector 80 may include a speed sensor, a manifold absolute pressure (MAP) sensor, a manifold air temperature (MAT) sensor, etc. The controller 90 causes the driving information detector 80 to perform the functions, such as detecting driving information.

The controller 90 determines whether a driving area of the vehicle is a use area of the EGR apparatus from the driving information (S20). For example, in a general gasoline engine, an EGR ratio according to an engine speed (rpm) and an engine load is determined in an engine speed range of 1,000-4,000 rpm and is previously stored at the controller 90 in a map data form. That is, the controller 90 may determine whether an EGR apparatus is in the use area according to the engine speed and the engine load.

The controller 90 controls an open level of the EGR valve 54 and operation of the flow rate adjustment apparatus 100 according to a use area of the EGR apparatus.

Specifically, if a driving area of the vehicle is not the use area of the EGR apparatus, the controller 90 closes the EGR valve 54 to block an exhaust gas that flows the exhaust line 30 from being injected into the intake line 10 through the recirculation line 52 (S30).

If the driving area of the vehicle is the use area of the EGR apparatus from driving information at step S20, the controller 90 opens the EGR valve 54 (S40) and enables an exhaust gas that flows the exhaust line 30 to be injected into the intake line 10 through the recirculation line 52.

The pressure sensor 58 measures a pressure of a recirculation gas that flows the recirculation line 52 (S50). A pressure of the recirculation gas that flows the recirculation line 52 through the pressure sensor 58 is transmitted to the controller 90.

The controller 90 determines whether the pressure of the recirculation gas is equal to or larger than a reference pressure (S60), and if a pressure of a recirculation gas is equal to or larger than the reference pressure, the controller 90 blocks the power that is supplied to the drive motor 110 of the flow rate adjustment apparatus 100 (S62) to enable the flap 130 that is installed in the rotating shaft 120 of the drive motor 110 to freely rotate. The controller 90 adjusts an open level of the EGR valve 54 to control the EGR ratio. In this case, the controller 90 may calculate a recirculation gas amount that currently flows the recirculation line 52 from a rotational speed of the flap 130 that is detected through the speed sensor 140 of the flow rate adjustment apparatus 100 and a recirculation gas pressure that is measured by the pressure sensor 58 that is installed in the recirculation line 52 and may accurately control an EGR ratio using the calculated recirculation gas amount.

If a pressure of a recirculation gas is smaller than the reference pressure, the controller 90 supplies power to the drive motor 110 to control a rotational speed of the flap 130 that is installed in the drive motor 110 according to a pressure of the exhaust gas and a target EGR ratio (S64).

The controller 90 may compensate for the EGR ratio according to a humidity of new air that is measured through the humidity sensor 59.

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. A method of controlling an engine system, which includes an engine and an exhaust gas recirculation (EGR) apparatus that supplies a portion of an exhaust gas discharged from the engine to a combustion chamber of the engine, the method comprising steps of:
   detecting, by a driving information detector, driving information;
   determining, by a controller, whether the EGR apparatus is in an use area based on the driving information; and
   controlling, by the controller, when the EGR apparatus is in the use area, operation of a flow rate adjustment apparatus and an EGR valve of the EGR apparatus.

2. The method of claim 1, wherein the step of controlling the operation of the flow rate adjustment apparatus comprises:
   opening, by the controller, the EGR valve when the EGR apparatus is in the use area;
   measuring, by a pressure sensor that is disposed in a recirculation line of the EGR apparatus, a pressure of the exhaust gas flowing through the recirculation line; and
   controlling, by the controller, operation of a drive motor of the flow rate adjustment apparatus.

3. The method of claim 2, further comprising: controlling, when a pressure of the recirculation gas is smaller than a reference pressure, a rotational speed of a flap that is installed in the drive motor according to the pressure of the exhaust gas and a target EGR ratio by applying a power to the drive motor.

4. The method of claim 2, further comprising: blocking, when the pressure of the recirculation gas is equal to or larger than the reference pressure, the power that is supplied to the drive motor and adjusting an open level of the EGR valve to control an EGR ratio.

5. The method of claim 1, further comprising, after the step of determining: closing the EGR valve, when the EGR apparatus is not in the use area based on a determination result.

6. An engine system having an exhaust gas recirculation (EGR) apparatus, the engine system comprising:
   an engine comprising a plurality of combustion chambers that generate a driving torque by combustion of fuel;
   an intake line through which an intake gas supplied to the plurality of combustion chambers flows;
   an exhaust line in which an exhaust gas discharged from the plurality of combustion chambers flows; and a turbocharger comprising: a turbine disposed in the exhaust line and rotating by the exhaust gas that is discharged from the plurality of combustion chambers; and a compressor, which is disposed in the intake line, rotating by interlocking with the turbine and compressing external air, wherein the EGR apparatus includes: a recirculation line branched from the exhaust line to join the intake line; an EGR valve disposed in the recirculation line and adjusting a recirculation gas amount; a pressure sensor disposed at a front end of the EGR valve of the recirculation line to measure a pressure of a recirculation gas; and a flow rate adjustment apparatus installed at a rear end of the EGR valve of the recirculation line and adjusting the recirculation gas amount.

7. The engine system of claim 6, wherein the flow rate adjustment apparatus comprises:

a drive motor generating a power;

a flap disposed at a rotating shaft of the drive motor and rotating by the recirculation gas that flows through the recirculation line; and a speed sensor detecting a rotational speed of the flap.

8. The engine system of claim 7, wherein the flap is disposed vertically relative to a movement direction of the recirculation gas which flows through the recirculation line.

9. The engine system of claim 7, wherein the rotating shaft of the drive motor is disposed outside an exterior circumference of the recirculation line.

10. The engine system of claim 7, further comprising:

a driving information detector detecting driving information of a vehicle; and a controller that controls the flow rate adjustment apparatus according to the driving information.

11. The engine system of claim 10, wherein the controller determines whether the EGR apparatus is in a use area from the driving information, and when the EGR apparatus is not in the use area, the controller closes the EGR valve.

12. The engine system of claim 11, wherein when the EGR apparatus is in the use area, the controller opens the EGR valve, and wherein when an internal pressure of the recirculation line, which is detected by the pressure sensor, is equal to or larger than a reference pressure, the controller cuts off power that is supplied to the drive motor and adjusts an open level of the EGR valve to control an EGR ratio.

13. The engine system of claim 12, wherein the controller supplies the power to the drive motor and controls the rotational speed of the flap according to a pressure of the recirculation gas and a target EGR ratio, if the internal pressure of the recirculation line t is smaller than the reference pressure.

* * * * *